US008340961B2

(12) United States Patent
Lin et al.

(10) Patent No.: US 8,340,961 B2
(45) Date of Patent: *Dec. 25, 2012

(54) BEAMFORMING CODEBOOK GENERATION SYSTEM AND ASSOCIATED METHODS

(75) Inventors: Xintian E. Lin, Mountain View, CA (US); Qinghua Li, Sunnyvale, CA (US)

(73) Assignee: Intel Corporation, Santa Clara, CA (US)

(*) Notice: Subject to any disclaimer, the term of this patent is extended or adjusted under 35 U.S.C. 154(b) by 624 days.

This patent is subject to a terminal disclaimer.

(21) Appl. No.: 12/583,954

(22) Filed: Aug. 28, 2009

(65) Prior Publication Data

US 2009/0323844 A1   Dec. 31, 2009

Related U.S. Application Data

(63) Continuation of application No. 11/036,906, filed on Jan. 13, 2005, now Pat. No. 7,778,826.

(51) Int. Cl.
*G10L 19/00* (2006.01)
*H04K 1/10* (2006.01)

(52) U.S. Cl. ........................ 704/223; 375/260
(58) Field of Classification Search ........... 704/223; 375/260
See application file for complete search history.

(56) References Cited

U.S. PATENT DOCUMENTS

| | | | |
|---|---|---|---|
| 6,456,620 B1 | 9/2002 | Wang et al. | |
| 6,456,838 B1 | 9/2002 | Wang et al. | |
| 6,704,703 B2 | 3/2004 | Ferhaoui et al. | |
| 6,789,059 B2 | 9/2004 | Kandhadai et al. | |
| 6,859,503 B2 | 2/2005 | Pautler et al. | |
| 6,927,728 B2 | 8/2005 | Vook et al. | |
| 7,092,452 B2 | 8/2006 | Taylor et al. | |
| 7,110,349 B2 | 9/2006 | Branlund et al. | |
| 7,266,042 B1 | 9/2007 | Gent et al. | |
| 7,330,701 B2 | 2/2008 | Mukkavilli et al. | |
| 7,336,727 B2 | 2/2008 | Mukkavilli et al. | |
| 7,340,282 B2 | 3/2008 | Park et al. | |
| 7,362,822 B2 | 4/2008 | Li et al. | |
| 7,409,001 B2 | 8/2008 | Ionescu et al. | |
| 7,539,253 B2 | 5/2009 | Li et al. | |
| 7,539,259 B2 * | 5/2009 | Dias et al. | 375/267 |
| 7,602,745 B2 | 10/2009 | Lin et al. | |

(Continued)

FOREIGN PATENT DOCUMENTS

TW   579160 U   3/2004

(Continued)

OTHER PUBLICATIONS

International Search Report and Written Opinion for PCT Patent Application No. PCT/US2006/000373, Mailed May 26, 2006, 11 Pages.

(Continued)

*Primary Examiner* — Susan McFadden
(74) *Attorney, Agent, or Firm* — Kacvinsky Daisak PLLC

(57) ABSTRACT

A codebook generation system and associated methods are generally described herein. For instance, a codebook generation agent (CGA) may implement techniques for generating one or more matrix codebooks from vector codebooks. The CGA may be implemented in mobile devices (e.g., stations, subscriber units, handsets, laptops, etc.). In this regard, the dynamic generation of matrix codebooks rather than having them stored on the mobile device enables the mobile device to utilize the memory normally consumed by the matrix codebooks in support of other features and/or services.

12 Claims, 3 Drawing Sheets

U.S. PATENT DOCUMENTS

| | | | |
|---|---|---|---|
| 7,613,228 B2 * | 11/2009 | Niedzwiecki | 375/144 |
| 7,656,965 B2 | 2/2010 | Shapira et al. | |
| 7,672,384 B2 * | 3/2010 | Giannakis et al. | 375/260 |
| 7,672,387 B2 | 3/2010 | Lin et al. | |
| 7,778,826 B2 | 8/2010 | Lin et al. | |
| 7,885,349 B2 | 2/2011 | Lee et al. | |
| 7,895,044 B2 * | 2/2011 | Lin et al. | 704/500 |
| 7,899,132 B2 | 3/2011 | Lee et al. | |
| 7,917,176 B2 | 3/2011 | Khojastepour et al. | |
| 7,961,808 B2 | 6/2011 | Ihm et al. | |
| 7,970,074 B2 | 6/2011 | Ihm et al. | |
| 8,064,386 B2 | 11/2011 | Pan et al. | |
| 8,103,312 B2 | 1/2012 | Khojastepour | |
| 8,184,732 B2 * | 5/2012 | Zheng et al. | 375/267 |
| 2001/0044717 A1 | 11/2001 | Ferhaoui et al. | |
| 2004/0178954 A1 | 9/2004 | Vook et al. | |
| 2006/0092054 A1 | 5/2006 | Li et al. | |
| 2009/0326933 A1 * | 12/2009 | Lin et al. | 704/223 |
| 2010/0067594 A1 * | 3/2010 | Lin et al. | 375/260 |
| 2010/0157921 A1 * | 6/2010 | Lin et al. | 370/329 |

FOREIGN PATENT DOCUMENTS

| | | |
|---|---|---|
| TW | 583860 B | 4/2004 |
| TW | 586280 B | 5/2004 |
| WO | 02/062002 A1 | 8/2002 |
| WO | 02/099995 A2 | 12/2002 |
| WO | 03/047032 A1 | 6/2003 |
| WO | 2006/029261 A1 | 3/2006 |
| WO | 2006/076213 A1 | 7/2006 |

OTHER PUBLICATIONS

Choi et al., "Interpolation Based Transmit Beamforming for MIMO-OFDM with Limited Feedback", IEEE International Conference on Communications, vol. 1, Jun. 20-24, 2004, pp. 249-253.

Tang et al.,"On ststolic arrays for recursive complex householder transformations with applications to array processing", International Conference on Acoustics, Speech and Signal Processing, vol. 2, Apr. 14-17, 1991, pp. 1033-1036.

So et al., "Stabilized Complex Downdating in Adaptive Beamforming", International Conference on Acoustics, Speech, and Signal Processing, vol. 5, Apr. 3-6, 1990, pp. 2659-2662.

Roh et al., "Channel Feedback Quantization Methods for MISO and MIMO Systems", IEEE International Symposium on Personal, Indoor, and Mobile Radio Communications, Sep. 5-8, 2004, pp. 805-809.

Office Action Received for Great Britain Patent Application No. GB0713039.6, mailed on Dec. 17, 2008, 2 pages.

International Preliminary Report on Patentability for PCT application No. PCT/US2006/0003737, mailed Jul. 26, 2007, 7 pages.

Office Action Received for Taiwanese Patent Application No. 95100643, mailed on Sep. 30, 2008, 8 pgs of Taiwanese Office Action including 5 pages of English Translation.

Office Action Received for Taiwanese Patent Application No. 95100643, mailed on Jan. 30, 2008, 12 pages of Taiwanese Office Action including 8 pages of English Translation.

Love et al., "Limited Feedback Precoding for Spatial Multiplexing Systems," Proceeding of IEEE Globecom 2003, vol. 4, Dec. 2003, pp. 1857-1861.

Hochwald et al., "Systematic Design of Unitary Space-Time Constellations", IEEE Transactions on Information Theory, vol. 46, Issue 6, Sep. 2000, pp. 1962-1973.

Office Action Received for Chinese Patent Application No. 200680007671.4, mailed on Aug. 3, 2010, 27 pages of Chinese Office Action including 16 pages of English Translation.

Office Action Received for Chinese Patent Application No. 200680007671.4, mailed on Jan. 17, 2011, 12 pages of Chinese Office Action including 7 pages of English Translation.

Office Action Received for Germany Patent Application No. 112006000195.7, mailed on Jul. 12, 2011, 12 pages of Germany Office Action and 9 pages of English Translation.

Roh et al., "Channel Feedback Quantization Methods for MISO and MIMO Systems", 15th IEEE International Symposium on Personal, Indoor and Mobile Radio Communications, PIMRC 2004, vol. 2, Sep. 5-8, 2004, pp. 805-809.

"3rd Generation Partnership Project; Technical Specification Group Radio Access Network; Evolved Universal Terrestrial Radio Access (E-UTRA); Physical Channels and Modulation", 3GPP TS 36.211 Release 8, V8.7.0, May 2009, Technical Specification, 10 pages.

Office Action received for China Patent Application No. 200680007671.4, mailed on Jan. 6, 2012, 3 pgs. of Chinese office action and 4 pages of English translation.

Office Action received for China Patent Application No. 200680007671.4, mailed on May 4, 2012, 3 pgs. of Chinese office action and 6 pages of English translation.

* cited by examiner

BEAMFORMING CODEBOOK GENERATION SYSTEM AND ASSOCIATED METHODS

CROSS-REFERENCE TO RELATED APPLICATIONS

This application is a continuation of U.S. patent application Ser. No. 11/036,906, filed Jan. 13, 2005, the entire disclosure of which is hereby incorporated by reference. This application is also related to U.S. patent application Ser. No. 12/584,009, U.S. patent application Ser. No. 12/583,994, and U.S. patent application Ser. No. 12/583,960, all filed concurrently herewith.

TECHNICAL FIELD

Embodiments of the invention are generally directed to communication systems and, more particularly, to a codebook generation system and associated methods.

BACKGROUND

Closed loop multiple-input-multiple-output (MIMO) systems typically transmit channel state information from a receiver to a transmitter. Transmitting the channel state information consumes bandwidth that might otherwise be available for data traffic.

Illustratively, conventional frequency division duplex (FDD) systems that employ beamforming (or, closed loop multiple input, multiple output (MIMO), the beamforming matrix (referred to herein as a codeword) generated in response to perceived channel conditions is computed and quantized at the receiver first, and then is provided to the source transmitter (e.g., via feedback). A conventional approach to reduce the overhead associated with this feedback is to provide matrix codebook(s) at each of the transmitter and the receiver, each of the codebook(s) comprising a plurality, or set, of potential beamforming matrixes that may be used depending on the channel conditions perceived at the receiver. When the receiver has identified the appropriate matrix codebook(s), the receiver will typically feed back only an index (instead of the actual matrix entries) that points to the appropriate codeword in the codebook(s) stored at the transmitter.

Thus, for a different combination of transmit antenna(e) ($N_t$) and data streams ($N_s$), a different matrix codebook is required. Conventionally, the size of the codebook is based on the number of transmit antennae and the number of data streams: $N_t \times N_s$. For some systems, e.g., one implementing the developing 802.16e[1], $N_t$ and $N_s$ are currently less than five (5) but are likely to increase to eight (8). Therefore, a substantial number of $N_t$ by $N_s$ combinations are anticipated, requiring a significant amount of memory within mobile communication devices in order to store such a large number of codebooks.

[1] See, e.g., the ANSI/IEEE Std 802.16-2001 Standard for Local and Metropolitan area networks Part 16: Air Interface for Fixed Broadband Wireless Access Systems, its progeny and supplements thereto (e.g., 802.16a, 0.16d, and 0.16e).

BRIEF DESCRIPTION OF THE DRAWINGS

Embodiments of the present invention are illustrated by way of example, and not by way of limitation, in the figures of the accompanying drawings in which like reference numerals refer to similar elements and in which.

DETAILED DESCRIPTION

Figure 1:
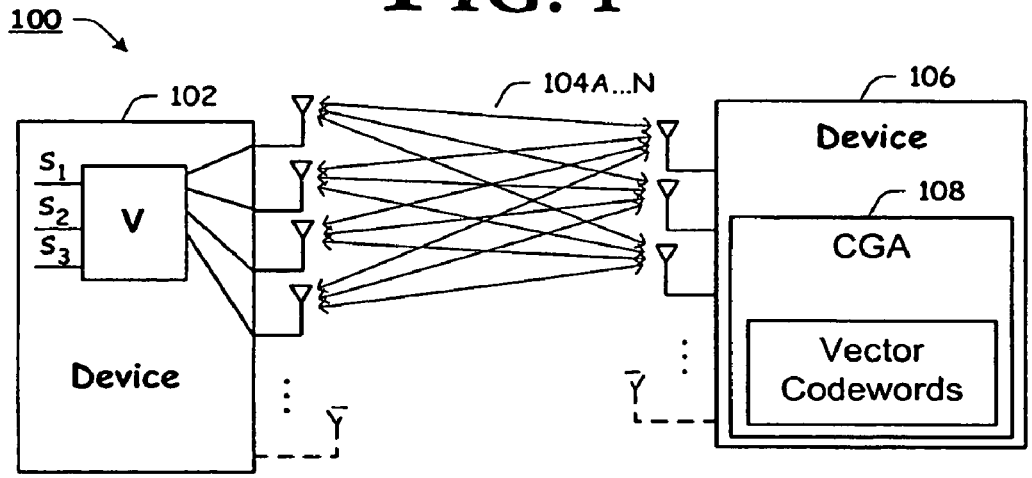
FIG. 1 is a block diagram of an example communication system within which embodiments of the invention may be practiced.

Embodiments of a codebook generation system and associated methods are generally presented. According to one embodiment, described more fully below, a codebook generation agent (CGA) is presented which may implement a method for generating one or more matrix codebooks from vector codebooks.

According to one embodiment, the CGA is implemented in mobile devices (e.g., stations, subscriber units, handsets, laptops, etc.), although the invention is not limited in this regard. As developed more fully below, the CGA may develop one or more matrix codebook(s) from matrix codewords that are dynamically generated from vector codebook(s) for 2-, 3-, 4-, . . . , N-unit vectors already resident on the device in support of other features (e.g., single data stream beamforming). In this regard, the use of the vector codebook(s) for 2-, 3- and 4-unit vectors does not add any extra complexity or memory drain to the mobile device. On the contrary, by dynamically generating the matrix codebooks rather than having them stored on the mobile device, enables the mobile device to utilize the memory normally consumed by the matrix codebooks in support of other features and/or services.

More particularly, as developed more fully below, the CGA may implement one or more of four (4) disclosed techniques for generating the matrix codebooks. According to some embodiments, the codebook generation agent may leverage the Householder reflection and an appropriate one or more vector codebook(s) of 2-, 3- and/or 4-unit vector matrix(ces) to generate one or more suitable matrix codeword(s) for compilation into a matrix codebook for a given set of channel conditions.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Technical detail regarding some of the operating characteristics of the mobile devices and/or the wireless communication network(s) in which the CGA may be implemented may be found in, e.g., the IEEE 802.11, 1999 Edition; Information Technology Telecommunications and Information Exchange Between Systems—Local and Metropolitan Area Networks—Specific Requirements, Part 11: WLAN Medium Access Control (MAC) and Physical (PHY) Layer Specifications, its progeny and supplements thereto (e.g., 802.11a, 0.11g and 0.11n). See, also, the IEEE Std 802.16-2001 IEEE Std. 802.16-2001 IEEE Standard for Local and Metropolitan area networks Part 16: Air Interface for Fixed Broadband Wireless Access Systems, its progeny and supplements thereto (e.g., 802.16a, 0.16d, and 0.16e).

Example Communications Environment

In FIG. 1, a block diagram of an example wireless communication environment 100 is depicted within which embodiments of the invention may well be practiced. In accordance with the illustrated example embodiment of FIG. 1, an example communications environment 100 is depicted comprising one wireless communications device 102 in communication with another wireless communications device 106 through a wireless communication link 104. As used herein, communication environment 100 is intended to represent any of a wide range of wireless communication networks including, but not limited to, a near-field communication (NFC) network, a wireless local area network (WLAN), a wireless metropolitan area network (WMAN), a cellular radiotelephony network, a personal communication system (PCS) network, and the like.

According to one embodiment, communication network 100 is an 802.16x communication network, and device 102 is a base station while device 106 is a subscriber station, although the scope of the invention is not limited in this regard. In a closed-loop MIMO (or, as above, a beamforming system) the data signal is first weighted by a beamforming matrix V, and then selectively transmitted by a plurality of antennae, as shown. According to one embodiment, the data signal may comprise a number of data streams ($N_1 \ldots N_s$), although the invention is not limited in this regard. The number of data streams may represent the number of spatial channels, with appropriate bit-loading, power weighting and sub-carrier assignments, although the invention is not limited in this regard.

According to one embodiment, with four (4) transmit antennae and three (3) data streams (for ease of illustration), the transmitted signal (x) transmitted via the $N_t$ antennae may be represented as:

$$x = V \times s \quad (1)$$

where $$V = \begin{bmatrix} v_{11} & v_{12} & v_{13} \\ v_{21} & v_{22} & v_{23} \\ v_{31} & v_{32} & v_{33} \\ v_{41} & v_{42} & v_{43} \end{bmatrix}, \text{ and } s = \begin{bmatrix} s_3 \\ s_2 \\ s_3 \end{bmatrix}$$

As shown, s is an $N_s$-vector of data symbols, and V is the $N_t$ by $N_s$ beamforming matrix developed from information (e.g., matrix codebook(s) and or indices thereto) fed back from a remote receiver. According to one embodiment, the beamforming matrix V is typically unitary, and power/bit loading is applied on vector s, as introduced above.

Device 106 is depicted comprising a codebook generation agent (CGA) 108 to dynamically generate one or more matrix codebook(s) from which channel state information may be characterized and fed back to the base station, 102. As introduced above, rather than storing one or more matrix codebooks, CGA 108 compiles the matrix codebooks necessary to characterize the channel state information from matrix codeword(s) dynamically generated from one or more vector codebook(s) for 2-, 3-, 4-, . . . , N-unit vectors. As discussed more fully below, the vector codebook(s) are recursively applied to a suitable transform (e.g., a Householder reflection) from the lowest-order codebook to the highest order codebook, as necessary to generate the desired size matrix codeword(s) from which the matrix codebook(s) are assembled.

It will be appreciated that but for the introduction of the CGA 108, device 106 is intended to represent any of a wide variety of electronic device(s) with wireless communication capability. In some embodiments, CGA 108 may well be implemented within a receiver element of a device. In other embodiments, CGA 108 is responsive to a communicatively coupled receiver to perform the functions described herein. According to some embodiments, CGA 108 may well be implemented in hardware, software, firmware and/or any combination thereof.

Example Operation

As introduced above, CGA 108 may generate the matrix codebook(s) from the one or more vector codebooks according to a number of techniques, each described more fully below. The first technique disclosed offers the closest approximation to the conventional technique of using stored matrix codebooks. The second through fourth technique disclosed also offer very good results, although with decreased computational complexity. In either case, the computational complexity is more than offset by the reduced memory that need be allocated to the storage of the matrix codebooks.

Figure 2:
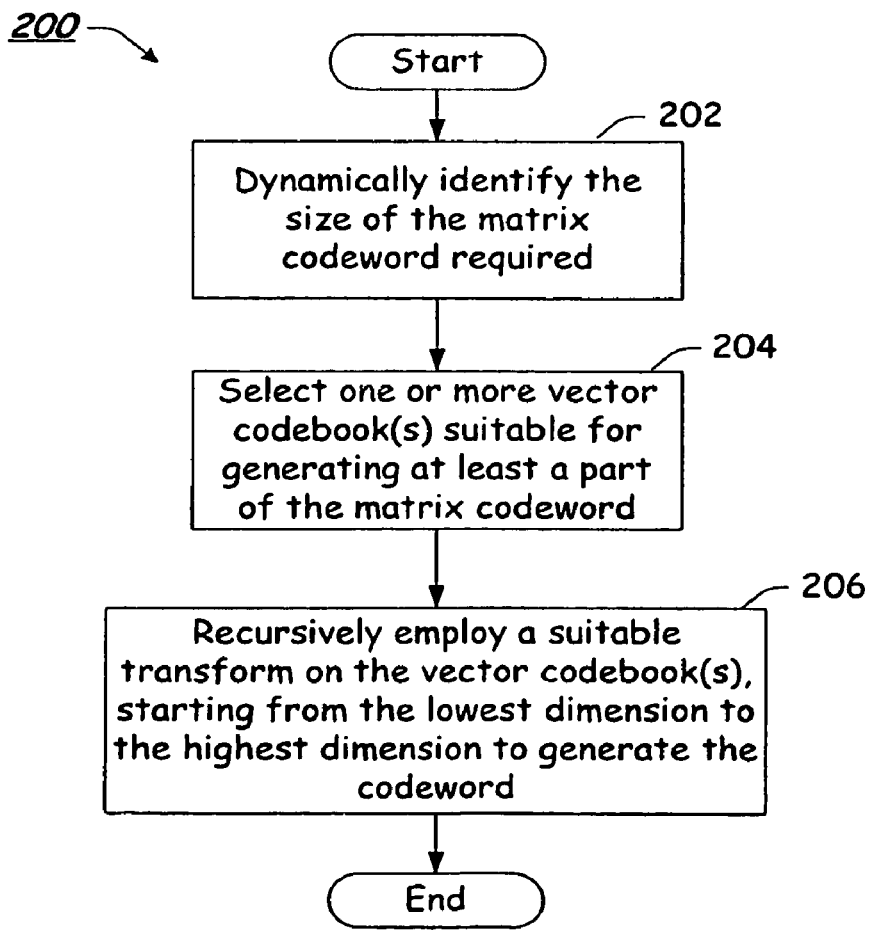
FIG. 2 is a flow chart of an example method for generating codebook(s), according to one embodiment.

Turning to FIG. 2, a flow chart of an example method for dynamically generating one or more matrix codebook(s) is generally presented, according to one embodiment. As shown, the method begins with block 202 by dynamically identifying the size of the matrix codeword(s) required. More particularly, according to one embodiment CGA 108 disposed within, or otherwise responsive to a receiver (e.g., 106) may be invoked to determine the size of the matrix codebook necessary. According to one embodiment, the size of the codeword required is dependent upon the number of transmit antennae ($N_t$) and/or the number of spatial data streams ($N_s$) utilized in the communication channel, although other parameters may be considered as a supplement to, or in place of, $N_t$ and/or $N_s$. According to one embodiment, the necessary parameters are either supplied to, or perceived by the receiver and/or CGA 108 for use in determining the size of the matrix codeword to generate.

As shown, CGA 108 is depicted comprising vector codebooks for 2-, 3-, 4-, . . . , N-unit (or, parameter) vectors. Accordingly, CGA 108 dynamically selects the vector codebook(s) suitable for a particular element of the recursive process for generating an element of the matrix codeword(s), as provided more fully below.

In response to determining the necessary size of the matrix codeword, CGA 108 may dynamically select an appropriate one or more vector codebook(s) suitable for generating at least an element of the matrix codeword, block 204. According to one embodiment, the vector codebook(s) selected by CGA 108 may depend on which of the techniques will be employed to generate the matrix codeword(s). According to one embodiment, the technique to be used is dynamically selected by CGA 108 and may depend on any of a number of factors including, but not limited to, the current processing load of the receiver and/or CGA 108, the perceived quality of the channel, and the like. That is, the current processing load of the receiver and/or CGA 108 may be such that a lower complexity codebook generation technique is required. Similarly, if the perceived quality of the channel (e.g., through signal-to-noise ratio, received power level, etc.) is high, CGA 108 may determine that a lower complexity codebook generation technique will provide suitable results, whereas a poorer channel may benefit from use of a more complex technique that more closely approximates the use of conventional (stored) codebooks.

Once the matrix codebook is generated, conventional techniques for computation and quantization of the proposed beamforming matrix may be employed, such as the one described in co-pending U.S. patent application Ser. No. 10/937,097 entitled Recursive Reduction of Channel State Feedback by Li, et al., commonly assigned to the Assignee of this application, and incorporated by reference herein for all purposes.

Returning to block 206, as provided above CGA 108 may employ one or more of at least four (4) techniques for recursively generating one or more matrix codeword(s) from vector codebook(s) for 2-, 3-, 4-, . . . N-unit vectors. It will be appreciated that other techniques for generating a matrix codeword from vector codebooks may well be used without deviating from the scope and spirit of the claims, below. Each of the four techniques are presented, as follows.

Technique 1

According to one embodiment, CGA 108 may generate a matrix codeword, column by column, using vector codebooks starting from the smallest dimension of the matrix codeword and working towards the largest dimension. For example, to generate a 4×3 matrix codeword, CGA 108 may employ unit vectors of dimensions 2, 3, and 4 sequentially, starting from the most inner-most parentheses (or, lowest dimension) and working out towards higher dimensions of the codeword, as shown:

$$V(l_{N_t}, \ldots, l_{N_t-N_s+1}) = P_{N_t}\begin{bmatrix} 1 & 0 & \cdots & 0 \\ 0 & & & \\ \vdots & P_{N_t-1}\begin{bmatrix} 1 & \ddots & & 0 \\ 0 & & & \\ \vdots & P_{N_t-N_s+2}\begin{bmatrix} 1 & 0 \\ 0 & \\ \vdots & V_{N_t-N_s+1}(l_{N_t-N_s+1}) \\ 0 & \end{bmatrix} \end{bmatrix} \\ 0 & & & \end{bmatrix}$$

$$P_i = I - \frac{2}{\|w^H w\|} w w^H$$

$$w = e^{-j\phi_{i\cdot 1}} v_i(l_i) - e_1$$

In the special case, $v_i = e_1$, the householder reflection can be computed as $P_i = I$. Without unnecessary repetition, it is understood that this special treatment is implied in all the following description.

The $N_t$ by $N_s$ matrix codeword is constructed from the last column recursively, where the iteration starts from the lower, right hand side corner. Successive iteration(s) adds one column and one row to the constructing matrix codeword. In this regard, let $\{v_i(l_i)\}_{l_i=1}^{L_i}$ denote the codebook of i-dimension unit vectors with $L_i$ codewords (i.e. vectors), where $l_i$ is the codeword index. Let $\{v_1(l_1)\}_{l_1=1}^{L_1} = \{1\}$, i.e. $v_1(1) = 1$ and $L_1 = 1$. Let $\{V_{N_t} \times N_s(l)\}_{l=1}^{L}$ denote the matrix codebook of dimension $N_t$ by $N_s$ with $L$ codewords, where $$L = \prod_{i=1}^{N_s} L_i.$$

The matrix codebook $\{V_{N_t} \times N_s(l)\}_{l=1}^{L}$ can be constructed by $N_s$ vector codebooks according to the following pseudo-code:

```
I.    FOR l_{N_t-N_s+1} = 1 : L_{N_t-N_s+1}
I.1.    IF N_t > N_s
I.1.1.      V_t = v_{N_t-N_s+1}(l_{N_t-N_s+1})
I.2.    ELSE
I.2.1       V_t = 1
I.3.    END
II.   FOR l_{N_t-N_s+2} = 1 : L_{N_t-N_s+2}
II.1.   w = e^{-j\phi_1} v_{N_t-N_s+2}(l_{N_t-N_s+2}) - e_1,
        where φ_1 is the phase of the first entry of v_{N_t-N_s+2}(l_{N_t-N_s+2}) and
        e_1 = [1,0 … 0]^T.
II.2.   P_{N_t-N_s+2} = I - \frac{2}{\|w^H w\|} w w^H
II.3.   V_t = P_{N_t-N_s+2} \begin{bmatrix} 1 & 0 \\ 0 & V_t \end{bmatrix}
III.  FOR l_{N_t-N_s+3} = 1 : L_{N_t-N_s+3}
…              …
N_s.  FOR l_{N_t} = 1 : L_{N_t}
N_s.1.      w = e^{-j\phi_1} v_{N_t}(l_{N_t}) - e_1,
            where φ_1 is the phase of the first entry of v_{N_t}(l_{N_t}).
N_s.2.                  P_{N_t} = I - \frac{2}{\|w^H w\|} w w^H
```

$N_s.3.$ $$V(l) = P_{N_t} \begin{bmatrix} 1 & 0 & \cdots & 0 \\ 0 & & & \\ \vdots & & V_t & \\ 0 & & & \end{bmatrix},$$

$$\text{where } l = 1_{N_t} + \sum_{i=N_t-N_s+1}^{N_t-1} l_i \prod_{j=i+1}^{N_t} L_j$$

$N_s.4.$ END

... ...
II.4. END
I.4. END

As shown above, CGA 108 may generate a matrix from the most inner core with the smallest dimension (the lowest dimension) to the full matrix. The lowest dimension core is either 1, or a vector of size $N_t-N_t-N_s+1$. Each expansion, or recursive iteration, effectively increases the size of the matrix by one row and one column. There are Ns FOR loops for Nt>Ns, and there are Nt-1 FOR loops for Nt=Ns. Each FOR loop corresponds to one expansion of the matrix codeword, each expansion generally comprising:

1) picking an appropriate vector from the vector codebook;
2) removing the phase of the first element of the vector by $e^{-j\Phi_1} v_{N_t}(1_{N_t})$ and subtract one from the first element of the phase corrected vector $w = e^{-j\Phi_1} v_{N_t}(1_{N_t}) - e_1$;
3) generating a Householder matrix $$P = I - \frac{2}{\|w^H w\|} w w^H;$$

4) padding zeros and a one in the previous expanded matrix V as $$\begin{bmatrix} 1 & 0 & \cdots & 0 \\ 0 & & & \\ \vdots & & V_t & \\ 0 & & & \end{bmatrix};$$

and
5) multiplying the Householder matrix with the padded matrix to finish one expansion.

Since the vector steps through the vector codebook, the number of runs for each FOR loop is equal to the number of vectors in the corresponding vector codebook. The index l is the index for the matrix finally generated. It increases as 1, 2, . . . , $L_{Nt}*L_{Nt-1} \cdots *L_{Nt-Ns+1}$, where $L_t$ is the number of vectors in the vector codebook of dimension t.

To reduce complexity and speed up computation, the phase of the first entry of each vector may be removed when CGA 108 stores each vector codebook as $e^{-j\Phi_1} v_{N_t}(1_{N_t})$. Namely, each first element of each vector in each vector codebook is real (not complex). The real number $$\frac{2}{\|w^H w\|}$$

may also be pre-computed and stored for each vector.

Technique 2

According to one embodiment, CGA 108 may well implement a second technique to generate one or more matrix codeword(s) from vector codebook(s) for 2-, 3-, 4-, . . . N-unit vectors. In this technique, CGA 108 employs the complementary property of unitary matrix as follows. Instead of generating a $N_t$ by $N_s$ matrix directly, it first generates a $N_t$ by $N_t$ matrix first and then cut a submatrix of dimension $N_t$ by $N_s$ from it.

This technique is the most efficient when it generates matrix codebook of dimension $N_t$ by $(N_t-1)$. As specified above, the stored $N_t$-vector codebook has the property that the $N_t$-vector codewords are spread over the complex $N_t$-sphere as uniformly as possible, where the minimum angle between any two vectors is maximized. Note that each vector has a complementary, orthogonal subspace, spanned by $(N_t-1)$ orthogonal vectors, and is orthogonal to the vector. The property of the vector codebook implies that the subspaces (i.e. $N_t$ by $(N_t-1)$ matrixes) are uniformly spread, where the minimum angle between any two subspaces is maximized. This maximum minimum angle is a desirable property for $N_t$ by $(N_t-1)$ matrix codebook. The major advantage of scheme 2 is that only one vector codebook is required to generate the $N_t$ by $(N_t-1)$ codebook, while $(N_t-1)$ vector codebooks are required in Technique 1.

Technique 2 is also efficient to generate matrix codebook of dimension $N_t$ by $N_s$, where $$N_s > \frac{N_t}{2}.$$

For this case, the CGA 108 first generates an $N_t \times N_t$ matrix, and then cuts a $N_t$ by $N_s$ submatrix from it as a matrix codeword. The pseudo code of the scheme is as follows, where the notations are already defined, above, in Technique 1. It is assumed that $$N_s > \frac{N_t}{2}.$$

One advantage of this scheme is that only $N_t-N_s$ vector codebooks are required to generate the $N_t \times N_s$ codebook, while $N_s$ vector codebooks may be required for Technique 1.

I. FOR $l_{N_s+1} = 1 : L_{N_s+1}$
  I.1. $w = e^{-j\phi_1} v_{N_s+1}(l_{N_s+1}) - e_1$ where $\phi_1$ is the phase of the first entry of $v_{N_t-N_s+2}(l_{N_t-N_s+2})$ and $e_1 = [1,0\ldots 0]^T$.

I.2. $V_t = I - \dfrac{2}{\|w^H w\|} ww^H$

II. FOR $l_{N_s+2} = 1 : L_{N_s+2}$
  II.1. $w = e^{-j\phi_1} v_{N_s+2}(l_{N_s+2}) - e_1$, where $\phi_1$ is the phase of the first entry of $v_{N_s+2}(l_{N_s+2})$ and $e_1 = [1,0\ldots 0]^T$.

II.2. $P_{N_s+2} = I - \dfrac{2}{\|w^H w\|} ww^H$

II.3. $V_t = P_{N_s+2} \begin{bmatrix} 1 & 0 \\ 0 & V_t \end{bmatrix}$

III. FOR $l_{N_s+3} = 1 : L_{N_s+3}$
  $\ldots$ $\ldots$ $N_s$. FOR $l_{N_t} = 1 : L_{N_t}$
  $N_s$.1. $w = e^{-j\phi_1} v_{N_t}(l_{N_t}) - e_1$, where $\phi_1$ is the phase of the first entry of $v_{N_t}(l_{N_t})$.

$N_s$.2. $P_{N_t} = I - \dfrac{2}{\|w^H w\|} ww^H$ $N_s$.3. $V_t = P_{N_t} \begin{bmatrix} 1 & 0 & \ldots & 0 \\ 0 & & & \\ \vdots & & V_t & \\ 0 & & & \end{bmatrix}$ $N_s$.4. $V(l) = $ last $N_s$ columns of $V_t$, where $l = l_{N_t} + \sum_{i=N_s+1}^{N_t-1} l_i \prod_{j=i+1}^{N_t} L_j$ $N_s$.5. END
  $\ldots$ $\ldots$
  II.4. END
I.3. END

40

Technique 3

According to one embodiment, CGA 108 may well implement a third technique to generate one or more matrix codeword(s) from vector codebook(s) for 2-, 3-, 4-, . . . N-unit vectors. This technique represents a further simplification over technique 2, above. For the generation of an $N_t$ by $(N_t-1)$ codebook, techniques 2 and 3 are very similar in terms of computational complexity. However, when generating an $N_t$ by $N_s$ codebook with L codewords, this third technique provides for the use of only one vector codebook with L codewords and span each vector into a $N_t$ by $N_t$ matrix using Householder reflection. The $N_t$ by $N_s$ matrix codebook is formed by taking a $N_t$ by $N_s$ submatrix from each spanned $N_t$ by $N_t$ matrix. Example pseudo code of for technique 3 is as follows:

1. FOR $l = 1 : L$
  2. $w = e^{-j\phi_1} v_{N_t}(l) - e_1$ where $\phi_1$ is the phase of the first entry of $v_{N_t}(l)$ and $e_1 = [1,0\ldots 0]^T$.

3. $V_t = I - \dfrac{2}{\|w^H w\|} ww^H$

4. $V(l) = $ last $N_s$ columns of $V_t$
5. END

Technique 4

According to one embodiment, CGA 108 may employ yet a fourth technique to generate matrix codeword(s) from vector codebook(s) for 2, 3, 4 . . . N-unit vectors, according to one embodiment. According to one embodiment, the fourth technique represents a further simplification of technique three, above. In particular, in step 4 of technique 3, CGA 108 may take any $N_s$ columns of Vt, such as the first $N_s$ columns, or $N_s$ columns extracted for the $N_t$ columns.

It should be appreciated that combinations of techniques 1-4 are possible, without deviating from the scope and spirit of the invention. For example, techniques 1 and 2 expand the matrix from a small core to a big matrix iteratively as shown above. According to one embodiment, the small core (or, lowest dimension) may be generated using other techniques. For example, to generate a 4×3 matrix, the core (lowest dimension) used in technique 1 may be generated by technique 3. In this regard, CGA 108 may use technique 3 to generate a core matrix of size 3×2 using a 3-vector codebooks, and then use the remaining teachings of technique 1 to finish the generation of 4×3 using the 3×2 core as the lowest dimension.

To illustrate the algorithm, we use an example of 3/6 bits vector codebooks to generate all the necessary matrix codebooks. In 802.16e, it may be desirable to implement codebooks, whose size L=3n bits, where n is integer.

Since there are many combinations of $N_t$, $N_s$, and L and each of them requires a corresponding codebook, the storage of all codebooks are burdensome. A set of codebooks is proposed, which can be dynamically generated with low complexity.

For small size codebooks, i.e. 2×1, 3×1, and 4×1 with 3 bit index, three optimized, random codebooks are stored. For 3×1 and 4×1 with 6 bit index, two structured codebooks are proposed, which can be dynamically generated using an improved Hochwald method. For all the other matrix codebooks such as 3×2 and 4×2, structured codebooks are proposed, which can also be dynamically generated with low complexity.

An example of stored vector codebooks for 2×1, 3×1, and 4×1 with 3 bit index are listed below in Table 1, Table 2, and Table 3. The notation $v(N_t, L)$ denotes the vector codebook (i.e. the set of complex unit vectors), which consists of $2^L$ unit vectors of a dimension $N_t$. The number L is the number of bits required for the feedback index that can indicate any vector in the codebook.

TABLE 1 v(2,3)

| Vector index | 1 | 2 | 3 | 4 | 5 | 6 | 7 | 8 |
|---|---|---|---|---|---|---|---|---|
| $v_1$ | 1 | 0.794 | 0.794 | 0.794 | 0.794 | 0.329 | 0.511 | 0.329 |
| $v_2$ | 0 | −0.580 + 0.182i | 0.058 + 0.605i | −0.298 − 0.530i | 0.604 + 0.069i | 0.661 + 0.674i | 0.475 − 0.716i | −0.878 − 0.348i |

TABLE 2 v(3,3)

| Vector index | 1 | 2 | 3 | 4 | 5 | 6 | 7 | 8 |
|---|---|---|---|---|---|---|---|---|
| $v_1$ | 1 | 0.500 | 0.500 | 0.500 | 0.500 | 0.495 | 0.500 | 0.500 |
| $v_2$ | 0 | −0.720 − 0.313i | −0.066 + 0.137i | −0.006 + 0.653i | 0.717 + 0.320i | 0.482 − 0.452i | 0.069 − 0.139i | −0.005 − 0.654i |
| $v_3$ | 0 | 0.248 − 0.268i | −0.628 − 0.576i | 0.462 − 0.332i | −0.253 + 0.263i | 0.296 − 0.480i | 0.620 + 0.585i | −0.457 + 0.337i |

TABLE 3 v(4,3)

| Vector index | 1 | 2 | 3 | 4 | 5 | 6 | 7 | 8 |
|---|---|---|---|---|---|---|---|---|
| $v_1$ | 1 | 0.378 | 0.378 | 0.378 | 0.378 | 0.378 | 0.378 | 0.378 |
| $v_2$ | 0 | −0.270 − 0.567i | −0.710 + 0.133i | 0.283 − 0.094i | −0.084 + 0.648i | 0.525 + 0.353i | 0.206 − 0.137i | 0.062 − 0.333i |
| $v_3$ | 0 | 0.596 + 0.158i | −0.235 − 0.147i | 0.070 − 0.826i | 0.018 + 0.049i | 0.412 + 0.183i | −0.521 + 0.083i | −0.346 + 0.503i |
| $v_4$ | 0 | 0.159 − 0.241i | 0.137 + 0.489i | −0.280 + 0.049i | −0.327 − 0.566i | 0.264 + 0.430i | 0.614 − 0.375i | −0.570 + 0.211i |

The matrix codebooks for multiple stream transmission are constructed from the vector codebooks in the previous section using three operations depicted next. We assume that all unit vectors in the section are complex with unit norm and the first entry of each vector is real. The first operation is called Householder reflection transformation. It is to generate a unitary N by N matrix H(v) using a unit N vector v as:

$$H(v) = \begin{cases} I, & v = e_1 \\ I - pww^H, & \text{otherwise,} \end{cases} \quad (1)$$

where $w = v - e_1$ and $e_1 = [1\ 0\ \ldots\ 0]^T$;

$$p = \frac{2}{\|w^H w\|}$$

and it is a real number that can be pre-computed and stored for each vector in the tables; I is the N by N identity matrix; $^H$ denotes the conjugate transpose operation.

The other two operations are built on Householder transformation. One of them is called H-concatenation, and the other is called H-expansion, where the "H" stands for Householder. The H-concatenation (HC) generates a N by M+1 unitary matrix from a unit N vector and a unitary N−1 by M matrix using Householder transformation as $$HC(v_N, A_{(N-1) \times M}) = H(v_N) \begin{bmatrix} 1 & 0 & \cdots & 0 \\ 0 & & & \\ \vdots & & A_{(N-1) \times M} & \\ 0 & & & \end{bmatrix}, \quad (3)$$

where N−1≧M; the N−1 by M matrix unitary matrix has property $A^H A = I$. Since both terms on the left are unitary the output of HC is a unitary matrix. The H-expansion (HE) generates a N by l matrix from a unit N vector, $v_N$, by taking the last M columns of H(v) as $$HE(V_N, l) = H(v_N)_{:, N-l+1:N}, \quad (4)$$

CGA 108 may selectively employ one or more of the operations defined in (2), (3), and (4) to jointly generate matrix codebooks as follows. In
Table, by K bit codebook we mean the codebook has $2^K$ matrixes, which requires a K bit feedback index.

TABLE 4

Construction operation for $N_t$ by $N_s$ beamforming matrix with 3, 6, and 9 bit codebooks.

| $N_s$ $N_t$ | 2 | 3 | 4 |
|---|---|---|---|
| 2 ant., 3 bit codebook | H(v(2,3)) | | |
| 3 ant., 3 bit codebook | HE(v(3,3),2) | H(v(3,3)) | |
| 4 ant., 3 bit codebook | HE(v(4,3),2) | HE(v(4,3),3) | H(v(4,3)) |
| 3 ant., 6 bit codebook | HC(v(3,3), v(2,3)) | HC(v(3,3), H(v(2,3))) | |
| 4 ant., 6 bit codebook | HC(v(4,3), v(3,3)) | HE(v(4,6),3) | H(v(4,6)) |
| 3 ant., 9 bit codebook | HC(v(3,6), v(2,3)) | HC(v(3,6), H(v(2,3))) | |

TABLE 4-continued

Construction operation for $N_t$ by $N_s$ beamforming matrix with 3, 6, and 9 bit codebooks.

| $N_s$ $N_t$ | 2 | 3 | 4 |
|---|---|---|---|
| 4 ant., 9 bit codebook | HC(v(4,6), v(3,3)) | HC(v(4,3), HC(v(3,3),v(2,3))) | HC(v(4,3), HC(v(3,3),H(v(23)))) |

The set notation $v(N_t,L)$ in the input parameter of the operations (i.e. H, HC, and HE) denotes that each vector in the codebook $v(N_t, L)$ is sequentially taken as an input parameter to the operations. The feedback index is constructed by concatenating all the indexes of the input argument vector codebooks in binary format. For example, the feedback index of HC(v(4,6), v(3,3)) is constructed as $i_2 j_2$, where $i_2$ and $j_2$ are the indexes of the vectors in codebook v(4,6) and v(3,3) in binary format respectively.

Performance Analysis

Figure 3:
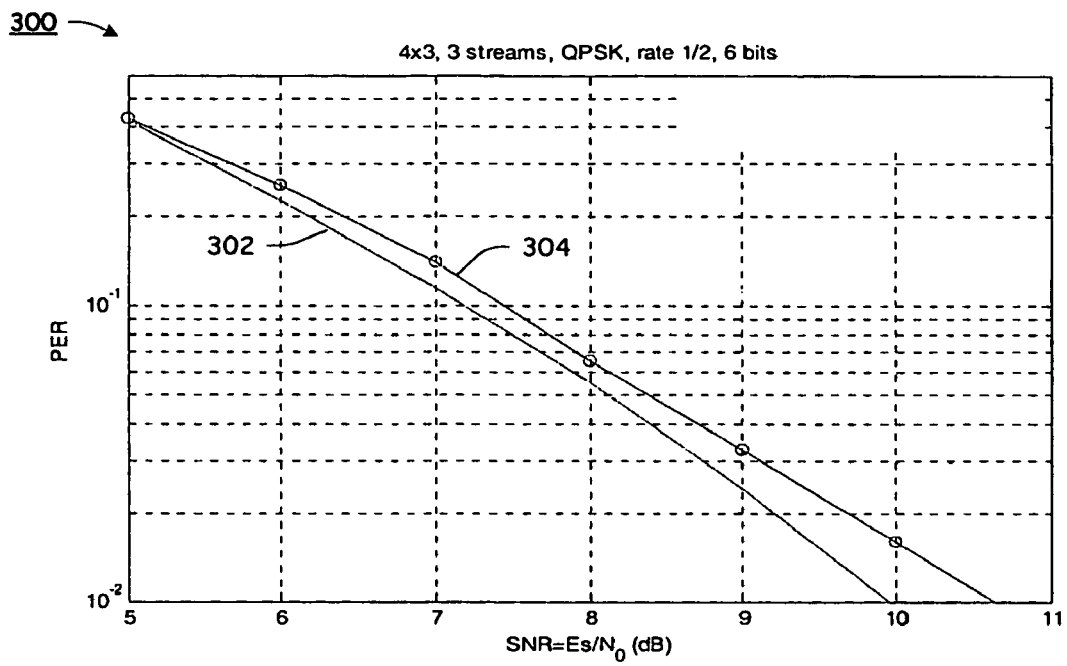
FIG. 3 provides a graphical representations of the performance of embodiments of the invention versus a conventional techniques.

Turning briefly to FIG. 3, a graphical representation of the performance improvements achieved through use of the codebook generation agent is depicted, according to one embodiment of the invention. The proposed codebook generation techniques were simulated and compared to conventional techniques. The frequency permutation is Band AMC in 802.16e D5 standard. ITU Pedestrian B, LOS channel model with 0.2 transmit antenna correlation is employed. Perfect channel estimation and slow speed are assumed. The amount of feedback from the mobile device (e.g., 106) to the base station (e.g., 102) is 6 bits per AMC band. With reference to FIG. 3, the feedback is the codebook index pointing a matrix codeword in a 64-codeword codebook. Packet error rate (PER) at the downlink is simulated, where packet size is 1000 bytes. As shown in FIG. 3, the simulation results demonstrate that the proposed technique(s) 302 provide similar or better performance with much lower storage complexities than conventional technique(s) 304.

Figure 4:
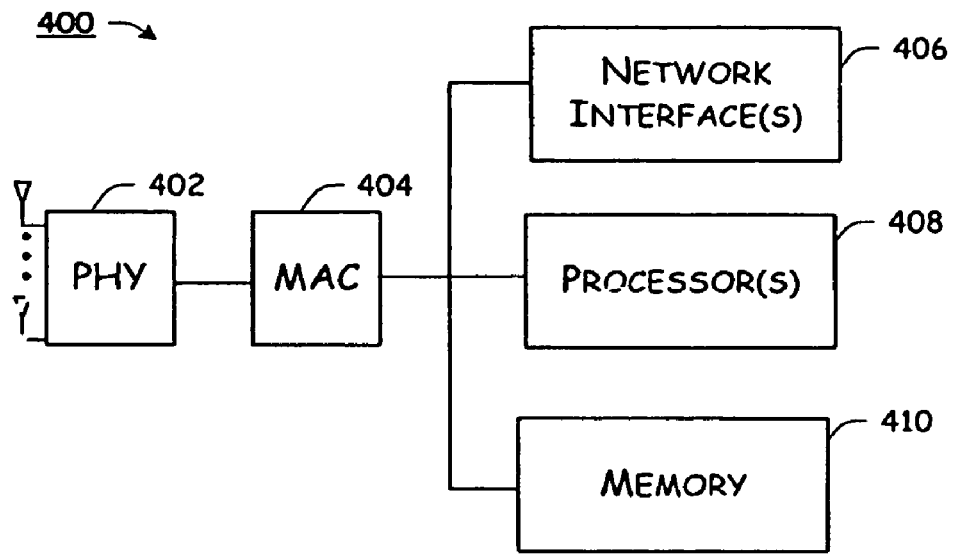
FIG. 4 is a block diagram of an example communications device incorporating one or more embodiments of the invention.

Having introduced the communication environment and operating characteristics of CGA 108 with respect to FIGS. 1 and 2, above, reference is now directed to FIG. 4 which provides an example electronic device architecture within which the CGA 108 may be practiced.

FIG. 4 illustrates a block diagram of an example architecture of an electronic device within which the teachings of the present invention may be practiced, according to one embodiment. Electronic device 400 includes antennas, physical layer (PHY) 402, media access control (MAC) layer 404, network interface(s) 406, processor(s) 408, and memory 410. In some embodiments, electronic device 400 may be a station capable of generating one or more matrix codebook(s) from matrix codeword(s) dynamically generated from vector codebook(s) for 2, 3, 4, . . . N-unit vectors by selectively performing Householder transformations as described above. In other embodiments, electronic device 400 may be a station that receives quantized column vectors, and performs beamforming in a MIMO system. For example, electronic device 400 may be utilized in a wireless network as station 102 or station 104 (FIG. 1). Also for example, electronic device 400 may be a station capable of performing the calculations shown in any of the equations above.

In some embodiments, electronic device 400 may represent a system that includes an access point, a mobile station, a base station, or a subscriber unit as well as other circuits. For example, in some embodiments, electronic device 400 may be a computer, such as a personal computer, a workstation, or the like, that includes an access point or mobile station as a peripheral or as an integrated unit. Further, electronic device 400 may include a series of access points that are coupled together in a network.

In operation, device 400 may send and receive signals using one or more of the antennas, wherein the signals are processed by the various elements shown in FIG. 4. As used herein, the antennae may be an antenna array or any type of antenna structure that supports MIMO processing. Device 400 may operate in partial compliance with, or in complete compliance with, a wireless network standard such as, e.g., the 802.11 or 802.16 standards introduced above.

Physical layer (PHY) 402 is selectively coupled to one or more of the antennae to interact with a wireless network. PHY 402 may include circuitry to support the transmission and reception of radio frequency (RF) signals. For example, in some embodiments, PHY 402 may include an RF receiver to receive signals and perform "front end" processing such as low noise amplification (LNA), filtering, frequency conversion or the like. Further, in some embodiments, PHY 402 may include transform mechanisms and beamforming circuitry to support MIMO signal processing. Also for example, in some embodiments, PHY 402 may include circuits to support frequency up-conversion, and an RF transmitter.

Media access control (MAC) layer 404 may be any suitable media access control layer implementation. For example, MAC 404 may be implemented in software, or hardware or any combination thereof. In some embodiments, a portion of MAC 540 may be implemented in hardware, and a portion may be implemented in software that is executed by processor 408. Further, MAC 404 may include a processor separate from processor 408.

In operation, processor 408 may read instructions and data from memory 410 and perform actions in response thereto. For example, processor 408 may access instructions from memory 410 and perform method embodiments of the present invention, such as method 200 (FIG. 2) or other methods described herein. In this regard, processor 408 is intended to represent any type of processor, including but not limited to, a microprocessor, a digital signal processor, a microcontroller, or the like.

Memory 410 represents an article that includes a machine readable medium. For example, memory 410 represents a random access memory (RAM), dynamic random access memory (DRAM), static random access memory (SRAM), read only memory (ROM), flash memory, or any other type of article that includes a medium readable by processor 408. Memory 410 may store instructions for performing the execution of the various method embodiments of the present invention. Memory 410 may also store vector codebooks of 2, 3, 4, . . . N-unit vectors, although the invention is not limited in this respect.

Network interface 406 may provide communications between electronic device 400 and other systems. For example, in some embodiments, electronic device 400 may be an access point that utilizes network interface 406 to communicate with a wired network or to communicate with other access points. In some embodiments, electronic device 400 may be a network interface card (NIC) that communicates with a computer or network using a bus or other type of port.

As used herein, embodiments of CGA 108 may well be implemented in one or more of PHY 402, MAC 404, processor(s) 408, and/or combinations thereof. As introduced above, CGA 108 may well be implemented in hardware, software, firmware or combinations thereof.

Although the various elements of device 400 are depicted as disparate elements in FIG. 4, embodiments are envisioned that may combine one or more elements, or that may contain more elements. For example, the circuitry of processor 408, memory 410, network interface 406, and MAC 404 may well be integrated into a single integrated circuit. Alternatively, memory 410 may be an internal memory within processor 408, or may be a microprogram control store within processor 410. In some embodiments, the various elements of device 400 may be separately packaged and mounted on a common circuit board. In other embodiments, the various elements are separate integrated circuit dice packaged together, such as in a multi-chip module, and in still further embodiments, various elements are on the same integrated circuit die.

Alternate Embodiment(s)

Figure 5:
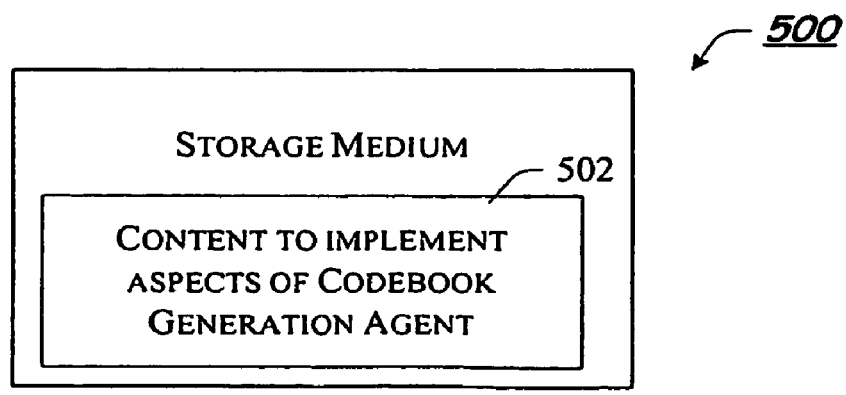
FIG. 5 is a block diagram of an example article of manufacture including content which, when executed by an accessing machine, causes the machine to implement one or more aspects of embodiment(s) of the invention.

FIG. 5 illustrates a block diagram of an example storage medium comprising content which, when invoked, may cause an accessing machine to implement one or more aspects of the codebook generation agent 108 and/or associated methods 300. In this regard, storage medium 500 may include content 502 (e.g., instructions, data, or any combination thereof) which, when executed, causes an accessing appliance to implement one or more aspects of the codebook generation agent 262 described above.

The machine-readable (storage) medium 500 may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem, radio or network connection). As used herein, all of such media is broadly considered storage media.

It should be understood that embodiments of the present invention may be used in a variety of applications. Although the present invention is not limited in this respect, the circuits disclosed herein may be used in many apparatuses such as in the transmitters and receivers of a radio system. Radio systems intended to be included within the scope of the present invention include, by way of example only, wireless local area networks (WLAN) devices and wireless wide area network (WWAN) devices including wireless network interface devices and network interface cards (NICs), base stations, access points (APs), gateways, bridges, hubs, cellular radiotelephone communication systems, satellite communication systems, two-way radio communication systems, one-way pagers, two-way pagers, Dersonal communication systems (PCS), personal computers (PCs), personal digital assistants (PDAs), sensor networks, personal area networks (PANs) and the like, although the scope of the invention is not limited in this respect. Such devices may well be employed within any of a variety of Embodiments of the present invention may also be included in integrated circuit blocks referred to as core memory, cache memory, or other types of memory that store electronic instructions to be executed by the microprocessor or store data that may be used in arithmetic operations. In general, an embodiment using multistage domino logic in accordance with the claimed subject matter may provide a benefit to microprocessors, and in particular, may be incorporated into an address decoder for a memory device. Note that the embodiments may be integrated into radio systems or hand-held portable devices, especially when devices depend on reduced power consumption. Thus, laptop computers, cellular radiotelephone communication systems, two-way radio communication systems, one-way pagers, two-way pagers, personal communication systems (PCS), personal digital assistants (PDA's), cameras and other products are intended to be included within the scope of the present invention.

The present invention includes various operations. The operations of the present invention may be performed by hardware components, or may be embodied in machine-executable content (e.g., instructions), which may be used to cause a general-purpose or special-purpose processor or logic circuits programmed with the instructions to perform the operations. Alternatively, the operations may be performed by a combination of hardware and software. Moreover, although the invention has been described in the context of a computing appliance, those skilled in the art will appreciate that such functionality may well be embodied in any of number of alternate embodiments such as, for example, integrated within a communication appliance (e.g., a cellular telephone).

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Any number of variations of the inventive concept are anticipated within the scope and spirit of the present invention. In this regard, the particular illustrated example embodiments are not provided to limit the invention but merely to illustrate it. Thus, the scope of the present invention is not to be determined by the specific examples provided above but only by the plain language of the following claims.

What is claimed is:

1. A wireless device, comprising:
a plurality of antennae to receive an index of a precoding matrix over a communication channel from a remote transmitter;
a memory to store a number of vectors; and
a codebook generator to select a vector from among the number of vectors stored in the memory based on the received index, to apply a Householder transformation to the selected vector to produce an output matrix, and to form the precoding matrix from one or more columns of the output matrix.

2. The device of claim 1, wherein the selected vector is represented by w, and
wherein the Householder transformation is $I-2ww^H/w^H w$, where I is an identity matrix, and $w^H$ is a conjugate transpose of the selected vector w.

3. The device of claim 1, wherein the codebook generator is further arranged to precode data for transmission over a wireless channel using the precoding matrix.

4. The device of claim 3, wherein the plurality of antennae includes four antennae to transmit the precoded data.

5. A wireless device for participating in closed-loop spatial multiplexing, comprising:
a memory to store a number of vectors;
a generator to select a vector, w, from among the number of vectors, to generate an output matrix $V_t=I-2ww^H/w^H w$, where t is an integer number of transmit antennae, I is at by t identity matrix, and $w^H$ is a conjugate transpose of the vector w, to form a precoding matrix V from s columns of the output matrix $V_t$, where s is an integer number of data streams, and to precode data for transmission via the t transmit antennae using the precoding matrix V.

6. The device of claim 5, wherein the generator selects the vector w based on a feedback index received over a wireless channel from a remote wireless station.

7. The device of claim 5, wherein the integer number of transmit antennae, t, is equal to four.

8. The device of claim 5, integer number of data streams, s, is equal to one, two, three, or four.

9. A base station, comprising:
a memory to store a number of vectors;
a generator to choose a vector from among the vectors stored in the memory based on an index received from a subscriber station, to apply a transformation to the vector to produce a square matrix, to select a subset of the square matrix as a precoding matrix, and to precode data with the precoding matrix; and
a plurality of antennae to transmit the precoded data over a wireless channel to the subscriber station.

10. The base station of claim 9, wherein the generator applies a Householder transformation to the vector.

11. The base station of claim 9, wherein the generator selects one or more columns of the square matrix as the precoding matrix.

12. The base station of claim 11, wherein the plurality of transmit antennae includes four antennae.

* * * * *